United States Patent
Blankenship

(10) Patent No.: US 6,784,262 B2
(45) Date of Patent: *Aug. 31, 2004

(54) PROCESSES FOR CHEMICALLY-MODIFYING THE SURFACE OF EMULSION POLYMER PARTICLES

(75) Inventor: Robert Mitchell Blankenship, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 150 days.

This patent is subject to a terminal disclaimer.

(21) Appl. No.: 09/962,987

(22) Filed: Sep. 25, 2001

(65) Prior Publication Data

US 2002/0065360 A1 May 30, 2002

Related U.S. Application Data

(60) Provisional application No. 60/236,542, filed on Sep. 29, 2000.

(51) Int. Cl.[7] ............................ C08F 2/28; C08F 265/00
(52) U.S. Cl. ........................ 526/82; 523/201; 523/202; 524/458; 524/460; 526/83; 526/84; 526/85; 526/930
(58) Field of Search .............................. 526/82, 83, 84, 526/85, 930; 523/207, 201, 202; 524/458, 460

(56) References Cited

U.S. PATENT DOCUMENTS

| 4,331,784 A | 5/1982 | Ishibashi et al. ............. 525/313 |
| 4,427,836 A | 1/1984 | Kowalski et al. ............ 525/301 |
| 5,296,524 A | 3/1994 | Waters ........................ 523/319 |
| 5,545,695 A | 8/1996 | Blankenship ................ 525/301 |
| 6,020,435 A * | 2/2000 | Blankenship et al. |
| 6,252,004 B1 * | 6/2001 | Blankenship et al. |

FOREIGN PATENT DOCUMENTS

| EP | 0453 614 A1 | 4/1990 | ........ C10M/171/00 |
| EP | 0915108 A1 | 5/1999 | ......... C08F/265/06 |
| EP | 0959176 A1 | 11/1999 | .......... D12H/19/42 |

* cited by examiner

Primary Examiner—Kelechi C. Egwim

(57) ABSTRACT

Processes for chemically-modifying the surface of an emulsion polymer particle are provided which include providing an aqueous emulsion polymer, a monomer at a level of at least 0.5% by weight based on the weight of the emulsion polymer and a, surface-modifying chemical capable of bonding with the monomer, under conditions where there is no substantial polymerization of the monomer, and then reducing the level of the monomer by at least 50%.

8 Claims, No Drawings

PROCESSES FOR CHEMICALLY-MODIFYING THE SURFACE OF EMULSION POLYMER PARTICLES

CROSS-REFERENCE TO RELATED PATENT APPLICATIONS

This is a non-provisional application of prior pending U.S. provisional application Serial No. 60/236,542 filed Sep. 29, 2000.

This invention relates to processes for chemically-modifying the surface of emulsion polymer particles and to surface-modified emulsion polymer particles. More particularly, it relates to a process for chemically-modifying the surface of emulsion polymer particles which provides increased surface concentration of bound surface-modifying chemical on the particles relative to the surface concentration which would be provided by prior processes.

It is often desirable to have a particular composition or functionality, referred to herein as "surface-modifying chemical", chemically bound to the surface of a polymer. For example, it is desirable to have acid-functionality attached to the surface of emulsion polymer particles to assist in the stabilization of the polymer particles in water. This may be effected, to varying degrees, by polymerizing acid-containing monomer throughout the polymerization of the other monomers, during portions of the polymerization of the other monomers, as a part of the polymerization of the monomers used to form an outer stage of a multi-stage polymer, or some combination thereof. However, incorporating the acid-containing monomer in parts of the emulsion polymer particle where it is not needed or desired is not only expensive and wasteful but may also cause performance problems such as reduced water-resistance and corrosion resistance and increased water sensitivity. In addition, attempts to provide bound surface-modifying chemical in a later or outer stage often leaves unincorporated or residual surface-modifying chemical in the aqueous medium. This residual surface-modifying chemical may further contribute to the water sensitivity of the system.

Even when one is successful in accomplishing complete incorporation of the surface-modifying chemical in an outer stage on the polymer particle, the polymer chains forming the outer stage may actually penetrate into the inner stage(s) of the polymer rather than forming a discrete outer stage. This penetration of the polymer chains forming the outer stage buries some surface-modifying chemical that is a part of the polymer chains within the polymer particle rather than on its surface. If the surface-modifying chemical is hydrophilic in nature or otherwise will form hydrogen bonds with water (as is the case with copolymerized acid-functional monomers), then it is believed that the polymer particle would be more thermodynamically stable if the material of interest were at the interface between the water and polymer particle surface in aqueous systems. However, because of the nature of the polymer chain entanglements, the polymer chains that contain the surface-modifying chemical may lack the necessary mobility to move to the interface between the water and polymer particle surface. Thus, it would be desirable to provide a process to improve the mobility of the polymer chains containing the bound surface-modifying chemical within the polymer particles, control the location of the surface-modifying chemical exclusively to where it is desired and thereby improve the overall efficiency of action of the material of interest.

A number of different techniques have been employed to improve the mobility of the polymer chains but each technique has serious drawbacks. For example, the polymer particles may be heated, preferably to a temperature above the glass transition temperature of the outer stage polymer, to improve the mobility of the polymer chains. However, heating involves an extra step and may degrade the polymer particles. Alternatively, the polymer particles may be permitted to age for a sufficient period of time to permit the polymer chains to move to the most thermodynamically stable configuration. This alternative is not acceptable because the time required for such movement could be unreasonably long, perhaps months or even years. A third option is to add an organic solvent to soften to the outer stage of the polymer particle and permit greater mobility of the polymer chains. This option leaves a solvent in the composition that may pose attendant safety, health and environmental problems and may need to be removed.

EP 915,108 A discloses a process for producing multistage emulsion polymers with improved extent of swelling and maintenance of dry bulking density, including the steps of:

(a) providing an aqueous emulsion of
 (i) multistage emulsion polymer, containing a core stage polymer and a shell stage polymer, wherein the core stage polymer contains, as polymerized units:
  (1) 5% to 100% by weight, based on the weight of the core stage polymer, of hydrophilic monoethylenically unsaturated monomer, and
  (2) 0% to 95% by weight, based on the weight of the core stage polymer, of at least one nonionic monoethylenically unsaturated monomer; and
   wherein the shell stage polymer contains, as polymerized units at least 50% by weight, based on the weight of the shell stage polymer, of nonionic monoethylenically unsaturated monomer; and
 (ii) monomer at a level of at least 0.5% by weight based on the weight of the multistage emulsion polymer; and
 (iii) swelling agent; under conditions wherein there is no substantial polymerization of the monomer; and
(b) reducing the level of monomer by at least 50%.

EP 959,176 A discloses processes to control the location of a second shell polymer in a multistaged polymer particle. The second shell polymer is formed from 93% to 99.9% by weight, based on the total weight of the second shell polymer, of at least one nonionic monoethylenically unsaturated monomer and from 0.1% to 7% by weight, based on the total weight of the second shell polymer, of an acid-functional monoethylenically unsaturated monomer. The second shell polymer has a glass transition temperature from $-15°$ C. to $-50°$ C.

Applicant has discovered a process to produce polymer particles having a chemically-modified surface. By employing this process, applicant produces polymer particles where the surface-modifying chemical need not be incorporated in portions of the polymer particles where it is not needed or where it is detrimental.

According to a first aspect of the present invention there is provided a process for chemically-modifying the surface of a polymer particle, including the steps of: (1) providing an aqueous emulsion comprising: (a) a multistage emulsion polymer including a core stage polymer and a shell stage polymer, wherein the core stage polymer includes, as polymerized units, from 5% to 100% by weight, based on the weight of the core stage polymer, of hydrophilic monoethylenically unsaturated monomer, and from 0% to 95% by weight, based on the weight of the core stage polymer, of at least one nonionic monoethylenically unsaturated monomer; and wherein the shell stage polymer includes, as polymerized units, at least 50% by weight of nonionic monoethylenically unsaturated monomer; (ii) a monomer at a level of at least 0.5% by weight based on the weight of the multistage emulsion polymer; and (iii) at least one surface-modifying chemical capable of chemically bonding with the monomer; under conditions wherein there is no substantial polymerization of the monomer; and (2) reducing the level of the monomer by at least 50%.

According to a second aspect of the present invention there is provided a process for chemically-modifying the surface of a polymer particle, including the steps of: (a) providing an aqueous emulsion, including: (i) a multistage emulsion polymer including a core stage polymer and a shell stage polymer; wherein the core stage polymer includes, as polymerized units, 0.1% to 100% by weight, based on the weight of the core stage polymer, of at least one nonionic monoethylenically unsaturated monomer; and wherein the shell stage polymer contains, as polymerized units: (1) at least 50% by weight, based on the weight of the shell stage polymer, of nonionic monoethylenically unsaturated monomer; and (2) at least one surface-modifying monomer; (ii) a monomer at a level of at least 0.5% by weight based on the weight of the multistage emulsion polymer; and (iii) neutralizing agent; under conditions wherein there is no substantial polymerization of the monomer; and (b) reducing the level of monomer by at least 50%.

According to a third aspect of the present invention there is provided a process for chemically-modifying the surface of a polymer particle including:(a) providing an aqueous emulsion including (i) an emulsion polymer containing, as polymerized units:
  (1) 5% to 100% by weight, based on the weight of said polymer, of hydrophilic monoethylenically unsaturated monomer and (2) 0% to 95% by weight, based on the weight of said polymer, of at least one nonionic monoethylenically unsaturated monomer;

(ii) a monomer at a level of at least 0.5% by weight based on the weight of said emulsion polymer;

(iii) optionally, neutralizing agent; and (iv) at least one surface-modifying chemical capable of chemically bonding with said monomer;

under conditions wherein there is no substantial polymerization of said monomer; and (b) reducing the level of said monomer by at least 50%.

The stages of the multistage polymers of the present invention include core stage 0 polymer (the "core"), and shell stage polymer (the "shell"). By "core" and "shell" herein is not intended to include only particles where a spherical core is completely encapsulated by a shell of uniform thickness. Rather, it is understood that other multistage polymer morphologies such as multiple cores, non-spherical cores, shells of non-uniform thickness, and shells incompletely encapsulating cores are also contemplated. Further, the core and shell may themselves be made up of more than one stage. There may also be one or more intermediate stages. Preferably, the multistage polymer comprises a core, an intermediate layer and a shell.

The cores of the multistage polymers of the present invention are emulsion polymers comprising, as polymerized units, from 5% to 100% by weight, based on the weight of the core, of at least one hydrophilic monoethylenically unsaturated monomer and from 0% to 95% by weight, based on the weight of the core stage polymer, of at least one nonionic monoethylenically unsaturated monomer.

Cores containing at least 5% by weight, based on the total weight of the core polymer, of at least one hydrophilic monoethylenically unsaturated monomer will generally result in a suitable degree of swelling. There may be instances wherein, because of the hydrophobicity of certain comonomers or combinations thereof in conjunction with the hydrophobic/hydrophilic balance of a particular hydrophilic monomer, the copolymer may be suitably prepared with less than 5% by weight, based on the total weight of the core polymer, of a hydrophilic monoethylenically unsaturated monomer. Preferably, the core comprises, as polymerized units, hydrophilic monoethylenically unsaturated monomer at a level of from 5% to 100%, more preferably, from 20% to 60%, and most preferably, from 30% to 50% by weight based on the total weight of the core. The hydrophilic core polymer may be made in a single stage or step of the sequential polymerization or may be made by a plurality of steps in sequence.

The multistage emulsion polymer of the present invention contemplates a core polymer wherein at least one hydrophilic monoethylenically unsaturated monomer is polymerized alone or with at least one nonionic monoethylenically unsaturated monomer. This process also contemplates, and includes in the term "hydrophilic monoethylenically unsaturated monomer," the use of a nonpolymeric compound containing at least one carboxylic acid group which may be absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomers useful for making the core polymer include, for example, acrylic acid, methacrylic acid, acryloxypropionic acid, methacryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are preferred.

Suitable nonpolymeric compounds containing at least one carboxylic acid group include $C_6$–$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

Suitable nonionic monoethylenically unsaturated monomers for making the hydrophilic core polymer include styrene, α-methyl styrene, p-methyl styrene, t-butyl styrene, vinyl toluene, ethylene, vinyl acetate, vinyl chloride, vinylidene chloride, (meth)acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like. By "(meth)acrylate" herein is meant acrylate or methacrylate.

The core, whether obtained by a single stage process or a process involving several stages, may have an average particle size of from 50 nm to 1.0 micron, preferably from 100 nm to 300 nm, diameter in unswollen condition. If the core is obtained from a seed polymer, the seed polymer preferably has an average particle size of from 30 nm to 200 nm.

The core may also optionally contain from 0 to 20% by weight, preferably from 0.1 to 3% by weight, based on the total weight of the core, of polyethylenically unsaturated monomer, wherein the amount used is generally approximately directly proportional to the amount of hydrophilic monoethylenically unsaturated monomer used; in other words, as the relative amount of hydrophilic monomer increases, it is acceptable to increase the level of polyethylenically unsaturated monomer. Alternatively, the core polymer may contain from 0.1 to 60% by weight, based on the total weight of the core polymer, of butadiene.

Suitable polyethylenically unsaturated monomers include alkylene glycol, di(meth)acrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth) acrylates; dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate, allyl acrylate, diallyl maleate, diallyl fumarate, diallyl itaconate and the like.

The multistage polymer of the present invention preferably contains an intermediate stage. The intermediate stage polymer, when present, partially or fully encapsulates the core and itself is partially or fully encapsulated by the shell. The intermediate stage is prepared by conducting an emulsion polymerization in the presence of the core.

The intermediate stage preferably contains, as polymerized units, from 0.3% to 20%, more preferably from 0.5% to 10% by weight, based on the weight of the core, of at least one hydrophilic monoethylenically unsaturated monomer. The intermediate stage preferably contains, as polymerized units, from 80% to 99.7%, more preferably from 90% to 99.5% by weight, based on the weight of the intermediate stage, of at least one nonionic monoethylenically unsaturated monomer. The hydrophilic monoethylenically unsaturated monomers and the nonionic monoethylenically unsaturated monomers useful for making the core are also useful for making the intermediate layer.

The shell of the multistaged polymer of this invention is the product of emulsion polymerizing at least 50%, preferably from 80% to 100%, more preferably from 90% to 100%, percent by weight, based on the total weight of the shell, of at least one nonionic monoethylenically unsaturated monomer. The nonionic monoethylenically unsaturated monomers suitable for the core are also suitable for the shell. Styrene is preferred.

The shell may also contain, as polymerized units, from 0% to 20%, preferably from 0% to 10%, by weight based on the weight of the shell, of one or more monoethylenically unsaturated monomers containing acid-functionality including acrylic acid, methacrylic acid, acryloxypropionic acid, (meth)acryloxypropionic acid, itaconic acid, aconitic acid, maleic acid, maleic anhydride, fumaric acid, crotonic acid, monomethyl maleate, monomethyl fumarate, monomethyl itaconate and the like. Acrylic acid and methacrylic acid are preferred.

In embodiments where a voided emulsion polymer particle is desired, the monomers used for the shell polymer and the relative proportions of them in the shell should be such that the shell is permeable to an aqueous or gaseous volatile or fixed basic neutralizing agent capable of swelling the core. In such cases monomeric mixtures for making the shell preferably contain from 0.1% to 10% by weight, based on the total weight of the shell polymer, of an acid-functional monoethylenically unsaturated monomer. Preferably, the proportion of acid-functional monoethylenically unsaturated monomer in the shell polymer does not exceed one-third the amount in the core polymer.

The presence of acid-functional monoethylenically unsaturated monomer in the shell polymer may serve several functions:

(1) stabilizing of the final multistage emulsion polymer;
(2) assuring permeability of the shell to a swelling agent; and
(3) compatibilizing the shell with the previously formed stage of the multistage emulsion polymer.

As used herein, the term "sequentially emulsion polymerized" or "sequentially emulsion produced" refers to polymers (including homopolymers and copolymers) which are prepared in aqueous medium by an emulsion polymerization process in the presence of the dispersed polymer particles of a previously formed emulsion polymer such that the previously formed emulsion polymers are increased in size by deposition thereon of emulsion its polymerized product of one or more successive monomer charges introduced into the medium containing the dispersed particles of the preformed emulsion polymer.

In the sequential emulsion polymerization of the multistage emulsion polymer, the term "seed" polymer is used to refer to an aqueous emulsion polymer dispersion which may be the initially-formed dispersion, that is, the product of a single stage of emulsion polymerization or it may be the emulsion polymer dispersion obtained at the end of any subsequent stage except the final stage of the sequential polymerization. Thus, a hydrophilic core polymer which is herein intended to be encapsulated by one or more subsequent stages of emulsion polymerization may itself be termed a seed polymer for the next stage.

The process of this invention contemplates that the core, the intermediate stage, the shell, or any combination thereof may be made in a single stage or step of the sequential polymerization or may be made by a plurality of steps in sequence following the polymerization. The first stage of emulsion polymerization in the process of the present invention may be the preparation of a seed polymer containing small dispersed polymer particles insoluble in the aqueous emulsion polymerization medium. This seed polymer may or may not contain any hydrophilic monomer component but provides the nuclei on which the hydrophilic core polymer, with or without nonionic comonomer, is formed.

The emulsion polymer of the third aspect of the present invention contains, as polymerized units, hydrophilic and nonionic monoethylenically unsaturated monomers; suitable monomers include those exemplified hereinabove for the core polymer of the multistage emulsion polymer.

A water-soluble free radical initiator is utilized in the aqueous emulsion polymerization. Suitable water-soluble free radical initiators include hydrogen peroxide; t-butyl peroxide; t-butyl hydroperoxide; t-amyl hydroperoxide;

alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from 0.01% to 3% by weight, based on the total amount of monomer and in a redox system the amount of reducing agent is preferably from 0.01% to 3% by weight based on the total amount of monomer. The temperature may be in the range of 10° C. to 100° C. In the case of the persulfate systems, the temperature is preferably in the range of 60° C. to 90° C. In the to redox system, the temperature is preferably in the range of 30° C. to 70° C., preferably below 60° C., more preferably in the range of 30° C. to 45° C. The type and amount of initiator may be the same or different in the various stages of the multistage polymerization.

One or more nonionic or anionic emulsifiers, or surfactants, may be used, either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, poly(ethylene oxide)/poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$–$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate. One or more surfactants are generally used at a level of from 0 to 3% by weight, based on the weight of the stage polymer. The surfactant(s) may be added prior to the addition of any monomer charge, during the addition of a monomer charge or a combination thereof. In certain monomer/emulsifier systems for forming the shell, the tendency to produce gum or coagulum in the reaction medium may be reduced or prevented by the addition of 0.05% to 2.0% by weight, based on total weight of the shell polymer, of emulsifier without detriment to the deposition of the polymer formed on the previously formed core particles.

The amount of emulsifier may be zero, in the situation wherein a persulfate initiator is used, to 3% by weight, based on the weight of the multistage polymer. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed polymer in each stage occurs upon the dispersed micelles or particles formed in the previous stages, that the concentration of emulsifier is kept low.

The weight-average molecular weight of the polymer formed in a given stage, as may be measured using gel permeation chromatography, may range from 100,000, or lower if a chain transfer agent is used, to several million. When 0.1% to 20% by weight, based on the weight of the monomer, of a polyethylenically unsaturated monomer mentioned hereinbefore is used in making the core, the molecular weight is increased whether or not crosslinking occurs. The use of the polyethylenically unsaturated monomer reduces the tendency of the core polymer to dissolve when the multistaged polymer is treated with a swellant for the core. If it is desired to produce a core having a molecular weight in the lower part of the range, such as from 20,000 to 500,000, it is frequently most practical to do so by using no polyethylenically unsaturated monomers and using a chain transfer agent, such as 0.05% to 2% or more by weight based on the weight of the stage polymer, such as, for example, alkyl mercaptans or alkyl mercaptoalkanoates.

The weight ratio of core to the intermediate stage, if present, is generally in the range of from 1:0.5 to 1:10, preferably in the range of from 1:1 to 1:7. The weight ratio of core to shell is generally in the range of from 1:5 to 1:20, preferably in the range of from 1:8 to 1:15.

The amount of polymer deposited to form shell polymer is generally such as to provide an overall diameter of the multistage polymer particle of from 70 nm to 4.5 microns, preferably from 100 nm to 3.5 microns, more preferably from 200 nm to 2.0 microns, in unswollen condition (that is, before any neutralization to raise the pH to at least 6) whether the shell polymer is formed in a single stage or in a plurality of stages. When the hydrophilic core polymer is fully encapsulated, it does not titrate with alkali metal bases under analytical conditions of about 1 hour at room temperature. The extent of encapsulation can be determined by removing samples during the course of the shell polymerization and titrating with sodium hydroxide.

The multistage emulsion polymer is prepared by sequential emulsion polymerization, which, as discussed above, includes charging the monomers which form the shell. At, or near, the conclusion of charging the monomers which form the shell, the contents of the reactor include the multistage polymer, water and unreacted monomer. Under the conditions of an emulsion polymerization, there is also an appreciable free-radical content, or radical flux, which keeps the polymerization process going. Even if no additional monomer or initiator is added, there is an appreciable free-radical content in the system. When there is no appreciable free-radical content, in other words, when the radical flux is very low or approaches zero, then no substantial amount of polymerization will occur.

We have discovered that this free-radical content interferes with the extent of swelling which can be achieved.

Previously known processes typically achieve swelling by adding a suitable swelling agent in the latter stages of charging the monomers which form the shell or at the completion of charging the monomers which form the shell. It is believed that the presence of unreacted monomer facilitates the transport of the swelling agent to the core. However, in previously known processes, the swelling agent was added to the system while there was still an appreciable free-radical content in the system. Thus, under those conditions, a substantial amount of polymerization was still occurring.

We have discovered that by providing an aqueous emulsion of the multistage emulsion polymer, monomer and neutralizing agent under conditions wherein there is no substantial polymerization of the monomer, we can enhance the extent of swelling of the multistage emulsion polymer.

There are many methods for providing that no substantial polymerization of monomer is occurring, including the addition of one or more polymerization inhibitors, the addition of one or more reducing agents, waiting for a sufficient period of time until there are no longer an appreciable number of free-radicals by virtue of them terminating, cooling the contents of the reactor to limit the reactivity of the free-radicals, and combinations thereof A preferred means involves the addition of one or more polymerization inhibitors such as, for example, N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-TEMPO (4-hydroxy-2,2,6,6,-tetramethylpiperidinyloxy, free radical), hydroquinone, p-methoxyhydroquinone, tert-butyl-p-hydroquinone, 2,5-di-tert-butyl-phydroquinone, 1,4-naphthalenediol, 4-tert butyl catechol, copper sulfate, copper nitrate, cresol and phenol. When used, the polymerization inhibitors or reducing agents are added in an amount effective to substantially stop any polymerization, generally from 25 to 5,000 parts per million ("ppm"), preferably from 50 to 3,500 ppm based on polymer solids. Preferably, the polymerization inhibitor(s) or reducing agent(s) are added while the multistage polymer is at or below the temperature at which the shell was polymerized, most preferably less than 10° C. below the temperature at which the shell was polymerized.

Monomer which is present after providing that no substantial polymerization of monomer is occurring may be:
(i) one or more of the monomers used to prepare any of the stages of the multistage or single stage polymer;
(ii) one or more monomers other than those used to prepare any of the stages of the multistage or single stage polymer; or
(iii) combinations thereof.
Preferably, monomer present at such time is one or more of the monomers used to prepare the shell. Such monomer may be unreacted monomer from preparing the multistage emulsion polymer, it may be separately added, or a combination thereof Preferably, the monomer is nonionic monomer. Nonionic monomer is preferred because acid-functional monomers will be neutralized by the neutralizing agent, and these neutralized monomers may be difficult to remove by polymerization. Preferably the level of monomer present after providing that no substantial polymerization of monomer is occurring is from 1 to 20 times as much as the standing monomer level during polymerization.

The surface-modifying chemical useful in the process of the invention is any chemical entity that is capable of chemically bonding with the ethylenically unsaturated monomer(s) present at a level of at least 0.5% by weight based on the weight of the emulsion polymer in step (a)(ii) of the processes of Claims 1–3 of the present invention. A wide variety of surface-modifying chemicals may be employed in the process of the invention, including monomers having at least one site of ethylenic unsaturation, terminally-unsaturated oligomers, egg hydroxyethyl cellulose or other cellulosics, polyvinyl alcohol, poly(N-vinyl pyrolidone), and polyacrylamides.

The amount of the surface-modifying chemical employed in the process of the invention depends largely on the final amount of the compound that is desired to be present on the surface of the emulsion polymer particles. Preferably, the surface-modifying chemical may be incorporated at 0.1% to 10% by weight, more preferably 0.2% to7.5% by weight, based on the dry weight of the polymer particles.

It is preferred to use one or more neutralizing agents. Suitable neutralizing agents include, are those which, in the presence of the multistage emulsion polymer and monomer, are capable of permeating the shell and swelling the core. Neutralizing agents may be aqueous or gaseous, volatile or fixed bases or combinations thereof.

Suitable neutralizing agents include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. Solvents, such as, for example, ethanol, hexanol, octanol, TEXANOL solvent and those described in U.S. Pat. No. 4,594,363, may be added to aid in fixed or permanent base penetration. Ammonia and ammonium hydroxide are preferred.

When trying to maximize the extent of swelling, it is preferable that the one or more neutralizing agents are added after providing that no substantial polymerization of monomer is occurring. The amount of neutralizing agent can be less than, equal to or greater than the amount needed to provide for complete neutralization of the core. Preferably, the amount of neutralizing agent is in the range of from 75% to 300%, more preferably in the range of from 90% to 250% based on the equivalents of the functionality in the core capable of being neutralized. It is also preferable to add the one or more neutralizing agents to the multistage emulsion polymer while the multistage emulsion polymer is at an elevated temperature, preferably at a temperature within 10° C. of the shell polymerization temperature. Swelling is generally very efficient under conditions of elevated temperature, in the presence of monomer and no substantial polymerization occurring. Under these conditions, swelling is generally complete within 30 minutes, preferably within 20 minutes, most preferably within 10 minutes of adding the one or more swelling agents.

The core polymer of the multistage emulsion polymer swells when the core is subjected to a basic swelling agent that permeates the shell to at least partially neutralize the hydrophilic-functionality of the core, preferably to a pH of at least about 6, more preferably to a pH of at least about 10, and thereby result in swelling of the hydrophilic core polymer. The swelling, or expansion, of the core may involve partial merging of the outer periphery of the core into the pores of the inner periphery of the shell and also partial enlargement or bulging of the shell and the entire particle overall.

When the swollen multistage emulsion polymer is dried, water and/or neutralizing agent are removed from the central region of the swollen multistage emulsion polymer, the core tends to shrink and a void develops, the extent of which depends upon the resistance of the shell to restoration to its previous size. This resistance of the shell restoring itself to its previous size is critical for minimizing the dry bulk density of the swollen multistage emulsion polymer. The expansion of the core results in expansion of the shell also. As the size of the shell is restored to its previous size, the dry bulk density increases. It is desirable, therefore, to minimize the extent to which the size of the shell is restored, thereby maximizing the dry bulk density of the swollen multistage emulsion polymer.

This can be accomplished by reducing the monomer level. It is believed that the presence of monomer may be helpful in facilitating the swelling of the multistage polymer, whether by plasticizing the shell, aiding in the transport through the shell or a combination thereof. However, the presence of monomer may be detrimental when trying to maximize swelling and minimize the dry bulk density of the swollen multistage emulsion polymer. Accordingly, after swelling the multistage emulsion polymer in the presence of both monomer and swelling agent, it is desirable to reduce the level of monomer to less than 10,000 ppm, preferably to less than 5,000 ppm based on polymer solids. This may be accomplished by any suitable means. Preferably, the level of monomer is reduced by polymerizing the monomer. This may be accomplished by any suitable means, such as by adding one or more initiators such as those recited above. It is preferred to begin to reduce the level of monomer within 20 minutes, more preferably within 10 minutes, of adding the one or more neutralizing agents.

Some embodiments of the present invention will now be described in detail in the following examples.

Abreviations

MMA=methyl methacrylate
MAA=methacrylic acid
AA=acrylic acid
EA=ethyl acrylate
BA=butyl acrylate
STY=styrene
SPS=sodium persulfate
NaDDBS=sodium dodecylbenzenesulfonate
IAA=isoascorbic acid
DI water=deionized water

Experimental Methods

Determination of Polymer Dry Density

The polymer dry density was determined according to the following method involving centrifugation of diluted latex samples. To a 50 ml centrifuge tube was added 6.3 g of polymer solids. DI water was added to the centrifuge tube so that the total weight of the added material was 35 g. This corresponded to 18% of polymer solids by weight. The centrifuge tube was allowed to spin at 18,000 revolutions per minute for 120 minutes. The supernatant was decanted and weight. The polymer dry density was then determined by the following equations.

$$d_{dry} = V\%_p \times d_p$$

$$V\%_p = 1 - V\%_{H_2O}$$

$$V\%_{H_2O} = \frac{V_{H_2O}}{V_{H_2O} + V_p} = \frac{(V_T - S_{H_2O}) \times C_{Pac} - V_p}{(V_T - S_{H_2O}) \times C_{Pac}}$$

$$V_{H_2O} = (V_T - S_{H_2O}) \times C_{Pac} - V_p$$

$$V_{H_2O} + V_p = (V_T - S_{H_2O}) \times C_{Pac}$$

$$C_{Pac} = \frac{V_{H_2O} + V_p}{V_{H_2O} + V_p + I_{H_2O}} = \frac{V_{H_2O} + V_p}{HardPack} = \frac{V_{H_2O} + V_p}{V_T - S_{H_2O}}$$

$$V_T = \frac{(W_T - W_p)}{d_{H_2O}} + \frac{W_p}{d_p}$$

Where:
$d_{dry}$=polymer dry density
$d_p$=polymer density=1.084 g/mL
$d_{H_2O}$=water density=1.000 g/mL
$V\%_p$=volume percent of polymer in particles
$V\%_{H_2O}$=volume percent of water inside particles
$W_p$=weight of polymer in tube=35.00 g×18%=6.30 g
$V_{H_2O}$=volume of water inside the particles
$I_{H2O}$=interstitial water volume $$S_{H_2O} = \text{volume of supernatant} = \frac{\text{weight of supernatant}}{d_{H_2O}} = \text{weight of supernatant}$$

$V_p$=polymer volume=6.30 g÷1.084 g/mL=5.81 mL
$V_T$=total volume in tube=$(W_T-W_p)/d_{H_2O}+V_p$=28.70 mL +5.81 mL=34.5
$C_{Pac}$ Packing constant, calculated using an unswollen latex of similar particle size The average value of the $C_{Pac}$ was then used.

| Latex from | Particle Size | $C_{Pac}$ |
|---|---|---|
| Example 3 | 417 nm | 0.622 |
| Example 4 | 420 nm | 0.624 |
| Comp. Ex. B | 426 nm | 0.633 |
| Example 8 | 444 nm | 0.616 |
| Comp. Ex. D | 425 nm | 0.631 |
| Average | — | 0.625 |

Therefore:

$$d_{dry} = \frac{V_p \times d_p}{(V_T - S_{H_2O}) \times C_{Pac}} = \frac{5.81 \times 1.084}{(34.51 - S_{H_2O}) \times 0.625} = \frac{10.08}{34.51 - S_{H_2O}} g/mL$$

CORE POLYMER A. Preparation of Core Polymer

A 5-liter, four necked round bottom flask was equipped with paddle stirrer, thermometer, nitrogen inlet and condenser. DI water (1700 g) was added to the kettle and heated to 85° C. under a nitrogen atmosphere. A monomer emulsion (ME) was prepared by mixing 720 g DI water, 5.2 g DISPONIL FES-993 surfactant (DISPONIL is a trade mark of Henkel Corp.), 10.0 g MAA, and 780 g MMA. From this ME, 164 g was removed and set aside. To the remaining ME was added 54.6 g DISPONIL FES-993, 260.0 g MMA, 250.0 g MAA, and 100.0 g DI water. With the kettle water at 85° C., the following materials were added in order: a solution of 1.5 g DISPONIL® FES-993 in 150.0 g DI water, the ME removed from the initial monomer emulsion and 20.0 g of rinse water, a solution of 5.5 g SPS in 40.0 g DI water. The contents of the kettle were stirred for 15 minutes. The remaining ME was added to the kettle over a two hour period at 85° C. After the completion of the monomer addition, the ME container was rinsed with 30.0 g DI water.

The dispersion was then held at 85° C. for additional 20 minutes, cooled to 25° C., and filtered to remove any coagulum. The filtered dispersion had a pH of 2.4, 31.7% solids content and an average particle size of 150 nm.

CORE POLYMER B. Preparation of Core Polymer

A 5-liter, four necked round bottom flask was equipped with paddle stirrer, thermometer; nitrogen inlet and condenser. DI water (1850 g) was added to the kettle and heated to 85° C. under a nitrogen atmosphere. A monomer emulsion (ME) was prepared by mixing 720 g DI water, 5.2 g DISPONIL FES-993 surfactant, 10.0 g MAA, and 845 g MMA. From this ME, 164 g was removed and set aside. To the remaining ME was added 54.6 g DISPONIL FES-993 surfactant, 445.0 g MAA, and 50.0 g DI water. With the kettle water at 85° C., the following materials were added in order: a solution of 0.5 g DISPONIL FES-993 surfactant in 70.0 g DI water, the ME removed from the initial monomer emulsion and 20.0 g DI water, a solution of 5.5 g of SPS in 40.0 g DI water. The contents of the kettle were stirred for 15 minutes. The remaining ME was added to the kettle over a two hour period at 85° C. After the completion of the monomer addition, the ME container was rinsed with 30.0 g DI water. The dispersion was then held at 85° C. for additional 20 minutes, cooled to 25° C., and filtered to remove any coagulum. The filtered dispersion had a pH of 2.3, 31.6% solids content and an average particle size of 182 nm.

CORE POLYMER C. Preparation of Core Polymer

A 5-liter, four necked round bottom flask was equipped with paddle stirrer, thermometer, nitrogen inlet and condenser. DI water (1675 g) was added to the kettle and heated to 89° C. under a nitrogen atmosphere. A monomer emulsion (ME) was prepared by mixing 720 g DI water, 4.08 g DISPONIL FES-993 surfactant (DISPONIL is a trade mark of Henkel), 10.8 g MAA, and 804 g MMA. From this ME, 151.5 g was removed and set aside. To the remaining ME was added 20.86 g DISPONIL FES-993 and 526.0 g MAA. With the kettle water at 89° C., the following materials were added in order: a solution of 0.54 g DISPONIL FES-993, in 150.0 g DI water, the ME removed from the initial monomer emulsion and 25.0 g of rinse water, a solution of 5.7 g SPS in 30.0 g DI water. The contents of the kettle were stirred for 20 minutes at 80° C. The remaining ME was added to the kettle over a two hour period at 80° C. After the completion of the monomer addition, the ME container was rinsed with 30.0 g DI water. The dispersion was then held at 80° C. for additional 20 minutes, cooled to 25° C., and filtered to remove any coagulum. The filtered dispersion had a pH of 2.3, 31.7% of solids content and an average particle size of 380 nm.

EXAMPLE 1

Preparation of Emulsion Polymer Particles Having Chemically-modified Surfaces. MAA was in the Entire Shell (ME II) Except in the Held-out Portion. Neutralization Took Place After Shell Polymerization.

A 5-liter, four necked round bottom flask was equipped with paddle stirrer, thermometer, nitrogen inlet and condenser. DI water (1400 g) was added to the kettle and heated to 82° C. under a nitrogen atmosphere. To the heated kettle water was added a solution of 2.5 g SPS in 20 g DI water. This was immediately followed by 157.7 g Core Polymer A and 20 g DI water. A monomer emulsion (ME I) that was prepared by mixing 40 g DI water, 3 g NaDDBS (23% in water), 50 g STY, 44 g MMA, and 6 g MAA was added to the kettle over a period of 40 minutes at 78° C. Upon the completion of ME I addition, the container was rinsed with 40 g DI water. A second monomer emulsion (ME II) was prepared by mixing 200 g DI water, 10 g NaDDBS (23%), and 679 g STY. From ME II 133 g were removed and set aside. MAA (21 g) was then added to the remaining ME II. ME II was added to the kettle over a period of 60 minutes and a solution of 1.0 g SPS in 60 g DI water was co-fed to the reactor at a rate of 1 g/min. The temperature of the kettle was increased to 92° C. Upon completion of ME II and SPS additions, the ME II container was rinsed with 40 g DI water. The reaction mixture was allowed to cool to 85° C. A mixture of 20 g 0.1% iron sulfate and 2 g of 1% versene was added and the reaction contents were held for 15 minutes. A mixture of 5 g of 5% 4-hydroxy TEMPO and 10 g DI water was added, followed by the held back portion of ME II (133 g) and 40 g DI water. Ammonium hydroxide (28%, 40.3 g) was then added and the reaction mixture was held at 85° C. for 10 minutes. A solution of 0.8 g SPS and 1.5 g 70% tert-butyl hydroperoxide in 45 g DI water was added, followed by a solution of 0.7 g IAA in 20 g DI water. The reaction mixture was held at 85° C. for 15 min and then cooled to room temperature and filtered to remove any coagulum formed. The final latex had a solids content of 28.9%, a pH of 10.2, and a particle size of 416 nm. The final latex was incorporated into a film to measure the Kubelka-Munk scattering coefficient (S/mil) as described in U.S. Pat. No. 4,427,836. S/mil of the resultant film was 0.45. The dry density was determined by the method in the experimental methods section to be 0.703 g/mL. An acid titration showed that the serum did not contain any acid. Titration of the deionized latex (after treatment with AMBERLITE IRN-77ion exchange resin (AMBERLITE is a trademark of Rohm and Haas Company)) in water showed that 24% of the shell acid was titratable and on the latex surface.

EXAMPLE 2

Preparation of Emulsion Polymer Particles Having Chemically-modified Surfaces. MAA was in the Second Half of the Shell (ME II, Except in the Held-out Portion). Neutralization Took Place After Shell Polymerization.

Example 1 was repeated except that the MAA was added in the second half of the remaining ME II after the removal of 133 g held-out ME II. That is, the remaining ME II was split to two equal portions. MAA was added to the second portion. The addition of ME II started with the portion without MAA followed by the portion with MAA. The addition times remained the same. The final latex had a solids content of 29.3%, a pH of 10.2, a particle size of 443 nm, and an S/mil 0.29. The dry density was determined to be 0.687. An acid titration showed that the serum did not contain any acid. Titration of the deionized latex (after treatment with AMBERLITE® IRN-77 ion exchange resin) in water showed that 53% of the shell acid was titratable and on the latex surface.

COMPARATIVE EXAMPLE A

Preparation of Emulsion Polymer Particles. MAA was in the Entire Shell (ME II). Neutralization Took Place After Half Way Through Shell Polymerization.

A 5-liter, four necked round bottom flask was equipped with paddle stirrer, thermometer, nitrogen inlet and condenser. DI water (1400 g) was added to the kettle and heated to 82° C. under a nitrogen atmosphere. To the heated kettle water was added a solution of 2.5 g SPS in 20 g DI water. This was immediately followed by 157.7 g Core Polymer A and 20 g DI water. A monomer Emulsion (ME I) that was prepared by mixing 40 g DI water, 3 g NaDDBS(23%), 50 g STY, 44 g MMA, and 6 g MAA was added to the kettle over a period of 40 minutes at 78° C. Upon the completion of ME I addition, the container was rinsed with 40 g DI water. A second monomer emulsion (ME n) was prepared by mixing 200 g DI water, 10 g NaDDBS (23%), 679 g STY, and 21 & MAA. ME II was added to the kettle over a period of 65 minutes and a solution of 1.0 g of SPS in 60 g DI water was co-fed to the reactor at a rate of 0.9 g/min. The temperature of the kettle was allowed to increase to 92° C. When half of the ME II was added, ammonium hydroxide (28%, 40.3 g) was added to the reaction mixture. Upon completion of ME II and SPS additions, the ME II container was rinsed with 80 g DI water. The reaction mixture was allowed to cool to 85° C. A mixture of 20 g 0.1% iron sulfate and 2 g I% versene was added, followed by a solution of 0.8 g SPS and 1.5 g 70% tert-butyl hydroperoxide in 45 g DI water. After addition of a solution of 0.7 g IAA in 20 g DI water, the reaction mixture was held at 85° C. for 15 min and then cooled to room temperature and filtered to remove any coagulum formed. The final latex had a solids content of 28.5%, a pH of 9.6, a particle size of 422 nm, and an S/mil 0.39. The dry density was determined to be 0.832 g/mL. An acid titration showed that the serum contained 41% of the ME II acid. Similarly, titration of the serum that was deionized with AMBERLITE IRN-77 ion exchange resin showed that it contained 39% of the ME II acid. Titration of the deionized in water showed that 57% of the shell acid was titratable, indicating 18% of the shell acid was on the latex surface.

TABLE 1

Methacrylic Acid Distribution for
Examples 1–2 and Comparative Example A.

| Emulsion Polymer | % Copolymerized Acid on Particle Surface |
|---|---|
| Example 1 | 24% |
| Example 2 | 53% |
| Comp. Ex. A | 18% |

The processes of Examples 1–2 of this invention provide emulsion polymer particles with higher surface acid than does the process of Comparative Example A.

EXAMPLE 3

Preparation of Emulsion Polymer Particles Having Chemically-modified Surfaces. MAA was in the Entire Shell (ME) Except in the Held-out Portion. Neutralization Took Place After Shell Polymerization.

A 5-liter, four necked round bottom flask was equipped with paddle stirrer, thermometer, nitrogen inlet and condenser. DI water (1500 g) was added to the kettle and heated to 85° C. under a nitrogen atmosphere. To the heated kettle water was added a solution of 2.5 g SPS in 20 g DI water. This was immediately followed by 22.3 g of an acrylic polymer dispersion (44.7% solids, 96 nm) and 20 g DI water. A monomer emulsion (ME) was prepared by mixing 250 g DI water, 12 g NaDDBS (23%), and 970 g STY. From this ME, 184 g were removed and set aside. MAA (30 g) was then added to the remaining ME. The ME was added to the reaction kettle over a period of 90 min and a solution of 1.0 g SPS in 60 g DI water was co-fed to the reactor at a rate of 0.68 g/min. The temperature was allowed to increase to 92° C. Upon completion of the ME and SPS additions, the ME container was rinsed with 40 g DI water. A mixture of 20 g 0.1% iron sulfate and 2 g 1% versene was added and the reaction contents were held at 92° C. for 15 min. A mixture of 5 g 5% 4-hydroxy TEMPO and 10 g DI water was added, followed by the held back portion of ME (184 g) and 40 g DI water. During the addition, the reaction mixture was cooled to 85° C. Ammonium hydroxide (28%, 31.8 g) was then added and the reaction mixture was held at 85° C. for 10 minutes. A solution of 0.8 g SPS and 1.5 g 70% tert-butyl hydroperoxide in 45 g DI water was added, followed by a solution of 0.7 g IAA in 20 g DI water. The reaction mixture was held at 85° C. for 15 minutes and then cooled to room temperature and filtered to remove any coagulum formed. The final latex had a solids content of 32.6%, a pH of 9.7, and a particle size of 417 nm. An acid titration showed that the serum did not contain any neutralized polymeric or monomeric acid. Titration of the deionized latex (after treatment with AMBERLITE IRN-77 ion exchange resin) in water showed that 16% of the shell acid was titratable and on the latex surface.

EXAMPLE 4

Preparation of Emulsion Polymer Particles Having Chemically-modified Surfaces. MAA was in the Second Half of the Shell (ME, Except in the Held-out Portion). Neutralization Took After Shell Polymerization.

Example 3 was repeated except the MAA was added in the second half of the remainder ME after the removal of held-out ME. That is, after taking 184 g ME and setting aside, the remaining ME was split to two equal portions. MAA (30 g) was added to the second portion. The addition of ME started with the portion without MAA then with the portion with MAA. The addition rates of ME and SPS remained the same. The final latex had a solids content of 32.3%, a pH of 9.9, and a particle size of 420 nm. An acid titration showed that the serum did not contain any neutralized polymeric or monomeric acid. Titration of the deionized latex (after treatment with AMBERLITE IRN-77 ion exchange resin) in water showed that 28% of the shell acid was titratable and on the latex surface.

COMPARATIVE EXAMPLE B

Preparation of Emulsion Polymer Particles. MAA was in the Entire Shell. Neutralization Took Place Half Way Through the Shell Polymerization.

A 5-liter, four necked round bottom flask was equipped with paddle stirrer, thermometer, nitrogen inlet and condenser. DI water (1500 g) was added to the kettle and heated to 85° C. under a nitrogen atmosphere. To the heated kettle water was added a solution of 2.5 g SPS in 20 g DI water. This was immediately followed by 22.3 g of an acrylic polymer dispersion (44.7% solids, 96 nm) and 20 g DI water. A monomer Emulsion (ME) was prepared by mixing 250 g DI water, 12 g NaDDBS (23%), 970 g STY and 30 g MAA. The ME was added to the kettle over a period of 90 min and a solution of 1.0 g SPS in 60 g DI water was co-fed to the reactor at a rate of 0.68 g/min. The temperature was allowed to increase to 92° C. When half of the ME was added, ammonium hydroxide (28%, 31.8 g) was added to the reaction mixture. Upon completion of the ME and SPS additions, the ME container was rinsed with 80 g DI water. The reaction mixture was cooled to 85° C. and a mixture of 20 g 0.1% iron sulfate and 2 g 1% versene was added. A solution of 0.8 g SPS and 1.5 g 70% tert-butyl hydroperoxide in 45 g DI water was then added, followed by a solution of 0.7 g IAA in 20 g DI water. The reaction mixture was held at 85° C. for 15 minutes and then cooled to room temperature and filtered to remove any coagulum formed. The final latex had a solids content of 32.3%, a pH of 9.7, and a particle size of 426 nm. An acid titration showed that the serum contained 57% of the shell acid. Titration of the deionized latex (after treatment with AMBERLITE IRN-77 ion exchange resin) in water showed that 55% of the shell acid was titratable, indicating that all the titratable acids were in the serum phase.

TABLE 2

Methacrylic Acid Distribution for
Examples 3–4 and Comparative Example B.

| Emulsion Polymer | % Copolymerized Acid on Particle Surface |
|---|---|
| Example 3 | 16% |
| Example 4 | 28% |
| Comp. Ex. B | 0% |

The processes of Examples 3–4 of this invention provide emulsion polymer particles with higher surface acid than does the process of Comparative Example B.

EXAMPLE 5

Preparation of Emulsion Polymer Particles Having Chemically-modified Surfaces. Acrylic Acid was in the Entire Shell (ME II) Except in the Held-out Portion. Neutralization Took Place After Shell Polymerization.

A 5-liter, four necked round bottom flask was equipped with paddle stirrer, thermometer, nitrogen inlet and condenser. DI water (1400 g) was added to the kettle and heated to 82° C. under a nitrogen atmosphere. To the heated kettle water was added a solution of 2.5 g SPS in 20 g DI water. This was immediately followed by 157.7 g Core Polymer A and 20 g DI water. A monomer Emulsion (ME I) that was prepared by mixing 40 g DI water, 3 g NaDDBS (23%), 50 g STY, 44 g MMA, and 6 g MAA was added to the kettle over a period of 40 min at 78° C. Upon the completion of ME I addition, the container was rinsed with 40 g DI water. A second monomer emulsion (ME II) was prepared by mixing 200 g DI water, 10 g NaDDBS (23%), and 686 g STY. From this ME II, 133 g were removed and set aside. AA (14 g) was then added to the remaining ME II. ME II was added to the kettle over a period of 60 min and a solution of 1.0 g SPS in 60 g DI water was co-fed to the reactor at a rate of 1 g/min. The temperature of the kettle was allowed to increase to 92° C. Upon completion of ME II and SPS additions, the ME II container was rinsed with 40 g DI water. The reaction mixture was allowed to cool to 85° C. A mixture of 20 g 0.1% iron sulfate and 2 g 1% versene was added and the reaction contents were held for 15 min. A mixture of 5 g 5% 4-hydroxy TEMPO and 10 g DI water was added, followed by the held back portion of ME II(133 g) and 40 g DI water. Ammonium hydroxide (28%, 32.0 g) was then added and the reaction mixture was held at 85° C. for 10 min. A solution of 0.8 g SPS and 1.5 g 70% tert-butyl hydroperoxide in 45 g of DI water was added, followed by a solution of 0.7 g IAA in 20 g DI water. The reaction mixture was held at 85° C. for 15 minutes and then cooled to room temperature and filtered to remove any coagulum formed. The final latex had a solids content of 28.8%, a pH of 9.9, a particle size of 424 nm, and an S/mil 0.40. The dry density was determined to be 0.719 g/mL. An acid titration showed that the serum contained 28% of the shell acid. Titration of the deionized latex (after treatment with Amberlite IRN-77) in water showed that 50% of the shell acid was titratable, indicating that 36% of the acid was on the particle surface.

EXAMPLE 6

Preparation of Emulsion Polymer Particles Having Chemically-modified Surfaces. Acrylic Acid was in the Second Half of the Shell (ME II, Except in the Held-out Portion). Neutralization Took Place After Shell Polymerization.

Example 5 was repeated except AA was added in the second half of the remainder ME II after the removal of held-out ME II. That is, after taking 133 g ME II and setting aside, the remaining ME II was split to two equal portions. AA was added to the second portion. The addition of ME II started with the portion without AA, followed with the portion with AA. The addition rates remained the same. The final latex had a solids content of 28.7%, a pH of 10.2, a particle size of 398 nm, and an S/mil 0.46. The dry density was determined to be 0.687 g/mL. An acid titration showed that the serum contained 37% of the shell acid. Titration of the deionized latex (after treatment with AMBERLITE IRN-77 ion exchange resin) in water showed that 62% of the shell acid was titratable, indicating that 45% of the acid was on the particle surface.

COMPARATIVE EXAMPLE C

Preparation of Emulsion Polymer Particles. Acrylic Acid was in the Entire Shell (ME II). Neutralization Took Place After Half Way Through Shell Polymerization.

A 5-liter, four necked round bottom flask was equipped with paddle stirrer, thermometer, nitrogen inlet and condenser. DI water (1400 g) was added to the kettle and heated to 82° C. under a nitrogen atmosphere. To the heated kettle water was added a solution of 2.5 g SPS in 20 g DI water. This was immediately followed by 157.7 g Core Polymer A and 20 g DI water. A monomer Emulsion (ME I) that was prepared by mixing 40 g DI water, 3 g NaDDBS (23%), 50 g STY, 44 g MMA, and 6 g MAA was added to the kettle over a period of 40 min at 78° C. Upon the completion of ME I addition, the container was rinsed with 40 g DI water. A second monomer emulsion (ME II) was prepared by mixing 200 g DI water, 10 g NaDDBS (23%), and 686 g STY, and 14 g AA. ME II was added to the kettle over a period of 65 min and a solution of 1.0 g SPS in 60 g DI water was co-fed to the reactor at a rate of 0.9 g/min. The temperature of the kettle was allowed to increase to 92° C. When half of the ME II was added, ammonium hydroxide (28%, 37.3 g) was added to the reaction mixture. Upon completion of ME II and SPS additions, the ME II container was rinsed with 80 g DI water. The reaction mixture was allowed to cool to 85° C. A mixture of 20 g 0.1% iron sulfate and 2 g 1% versene was added, followed by a solution of 0.8 g SPS and 1.5 g 70% tert-butyl hydroperoxide in 45 g DI water. After addition of a solution of 0.7 g IAA in 20 g DI water, the reaction mixture was held at 85° C. for 15 min and then cooled to room temperature and filtered to remove any coagulum formed. The final latex had a solids content of 28.8%, a pH of 10.0, a particle size of 494 nm, and an S/mil 0.40. The dry density was determined to be 0.808 g/mL. An acid titration showed that the serum contained 63% of the ME II acid. Titration of the deionized latex (after treatment with AMBERLITE IRN-77 ion exchange resin) in water showed that 76% of the shell acid was titratable, indicating that 28% of the acid was on the particle surface.

TABLE 3

Acrylic Acid Distribution for
Examples 5–6 and Comparative Example C.

| Emulsion Polymer | % Copolymerized Acid on Particle Surface |
|---|---|
| Example 5 | 36% |
| Example 6 | 45% |
| Comp. Ex. C | 28% |

The processes of Examples 5–6 of this invention provide emulsion polymer particles with higher surface acid than does the process of Comparative Example C.

EXAMPLE 7
Preparation of Emulsion Polymer Particles Having Chemically-modified Surfaces. Acrylic Acid was in the Outer Shell (ME III). Neutralization Took Place After Shell Polymerization.

A 5-liter, four necked round bottom flask was equipped with paddle stirrer, thermometer, nitrogen inlet and condenser. DI water (1400 g) was added to the kettle and heated to 82° C. under a nitrogen atmosphere. To the heated kettle water was added a solution of 2.5 g SPS in 20 g DI water. This was immediately followed by 157.7 g Core Polymer A and 20 g DI water. A monomer Emulsion (ME I) that was prepared by mixing 40 g DI water, 3 g NaDDBS (23%), 50 g STY, 44 g MMA, and 6 g MAA was added to the kettle over a period of 40 min at 78° C. Upon the completion of ME I addition, the container was rinsed with 40 g DI water. A second monomer emulsion (ME II) was prepared by mixing 150 g DI water, 8 g NaDDBS (23%), and 600 g STY. From this ME II, 128 g were removed and set aside. ME II was added to the kettle over a period of 60 min and a solution of 1.0 g SPS in 60 g DI water was co-fed to the reactor at a rate of 0.76 g/min. The temperature of the kettle was allowed to increase to 92° C. Upon completion of ME II, the ME II container was rinsed with 40 g DI water. The reaction mixture was cooled to 85° C. A third monomer emulsion (ME III) was prepared from 50 g DI water, 3 g NADDBS (23%), 95 g MMA, and 5 g AA. This ME III was added to the reaction mixture over a period of 20 min. Upon the completion of ME III and SPS additions, the ME III container was rinsed with 40 g DI water. A mixture of 20 g 0.1% iron sulfate and 2 g 1% versene was added and the reaction contents were held for 15 min. A mixture of 5 g 5% 4-hydroxy TEMPO and 10 g DI water was added, followed by the held back portion of ME II (133 g) and 40 g DI water. Ammonium hydroxide (28%, 26.1 g) was then added and the reaction mixture was held at 85° C. for 10 min. A solution of 0.8 g SPS and 1.5 g 70% tert-butyl hydroperoxide in 45 g DI water was added, followed by a solution of 0.7 g IAA in 20 g DI water. The reaction mixture was held at 85° C. for 15 min and then cooled to room temperature and filtered to remove any coagulum formed. The final latex had a solids content of 28.4%, a pH of 9.8, a particle size of 424 nm, and an S/mil 0.27. The dry density was determined to be 0.684 g/mL. An acid titration showed that the serum contained 20% of the shell acid. Titration of the deionized latex (after treatment with AMBERLITE IRN-77 ion exchange resin) in water showed that the total titratable acid was 108% of the shell acid.

EXAMPLE 8
Preparation of Emulsion Polymer Particles Having Chemically-modified Surfaces. Acrylic Acid was in the Entire Shell (ME) Except in the Held-out Portion. Neutralization Took Place After Shell Polymerization.

A 5-liter, four necked round bottom flask was equipped with paddle stirrer, thermometer, nitrogen inlet and condenser. DI water (1500 g) was added to the kettle and heated to 85° C. under a nitrogen atmosphere. To the heated kettle water was added a solution of 2.5 g SPS in 20 g DI water. This was immediately followed by 22.3 g of an acrylic polymer dispersion (44.7% solids, 96 nm) and 20 g DI water. A monomer Emulsion (ME) was prepared by mixing 250 g DI water, 12 g NaDDBS (23%), and 980 g STY. From this ME, 184 g were removed and set aside. AA (20 g) was then added to the remaining ME. The ME was added to the reactor over a period of 90 min and a solution of 1.0 g SPS in 60 g DI water was co-fed to the reactor at a rate of 0.68 g/min. The temperature was allowed to increase to 92° C. Upon the completion of ME and SPS additions, the ME container was rinsed with 40 g DI water. A mixture of 20 g 0.1% iron sulfate and 2 g 1% versene was added and the reaction contents were held at 92° C. for 15 min. A mixture of 5 g 5% 4-hydroxy TEMPO and 10 g DI water was added, followed by the held back portion of ME (184 g) and 40 g DI water. During the addition, the reaction mixture was cooled to 85° C. Ammonium hydroxide (28%, 25.3 g) was then added and the reaction mixture was held at 85° C. for 10 min. A solution of 0.8 g SPS and 1.5 g 70% tert-butyl hydroperoxide in 45 g DI water was added, followed by a solution of 0.7 g IAA in 20 g DI water. The reaction mixture was held at 85° C. for 15 minutes and then cooled to room temperature and filtered to remove any coagulum formed. The final latex had a solids content of 32.3%, a pH of 10.0, and a particle size of 444 nm. An acid titration showed that the serum contained 18% of the shell acid. Titration of the deionized latex (after treatment with AMBERLITE IRN-77 ion exchange resin) in water showed that 40% of the shell acid was titratable, indicating that 22% of the added AA was on the latex surface.

COMPARATIVE EXAMPLE D
Preparation of Emulsion Polymer Particles. Acrylic Acid was in the Entire Shell. Neutralization Took Place Half Way Through the Shell Polymerization.

A 5-liter, four necked round bottom flask was equipped with paddle stirrer, thermometer, nitrogen inlet and condenser. DI water (1500 g) was added to the kettle and heated to 85° C. under a nitrogen atmosphere. To the heated kettle water was added a solution of 2.5 g SPS in 20 g DI water. This was immediately followed by 22.3 g of a acrylic polymer dispersion (44.7% solids, 96 nm) and 20 g DI water. A monomer Emulsion (ME) was prepared by mixing 250 g DI water, 12 g NaDDBS (23%), 900 g STY and 20 g AA. The ME was added to the kettle over a period of 90 min and a solution of 1.0 g SPS in 60 g DI water was co-fed to the reactor at a rate of 0.68 g/min. The temperature was allowed to increase to 92° C. When half of the ME was added, ammonium hydroxide (28%, 31.8 g) was added to the reaction mixture. Upon completion of the ME and SPS additions, the ME container was rinsed with 80 g DI water. The reaction mixture was cooled to 85° C. and a mixture of 20 g 0.1% iron sulfate and 2 g 1% versene was added. A solution of 0.8 g SPS and 1.5 g 70% tert-butyl hydroperoxide in 45 g DI water was then added, followed by a solution of 0.7 g IAA in 20 g DI water. The reaction mixture was held at 85° C. for 15 min and then cooled to room temperature and filtered to remove any coagulum formed. The final latex had a solids content of 33.1%, a pH of 10.0, and a particle size of 425 nm. An acid titration showed that the serum contained 72% of the shell acid. Titration of the latex in water showed that 74% of the shell acid was titratable, indicating that only a very small amount of the acrylic acid was on the latex surface.

TABLE 4

Acrylic Acid Distribution for Examples 7–8 and Comparative Ex. D.

| Emulsion Polymer | % Copolymerized Acid on Particle Surface |
|---|---|
| Example 7 | 86% |
| Example 8 | 22% |
| Comp. Ex. D | 2% |

The processes of Examples 7–8 of this invention provide emulsion polymer particles with higher surface acid than does the process of Comparative Example D.

EXAMPLE 9
Preparation of Emulsion Polymer Particles Having Chemically-modified Surfaces. A Binder was Polymerized After the Shell Polymerization, the Binder Contained 5% of MAA. Neutralization Took Place After Binder Polymerization.

A 5-liter, four necked round bottom flask was equipped with paddle stirrer, thermometer, nitrogen inlet and condenser. DI water (1300 g) was added to the kettle and heated to 82° C. under a nitrogen atmosphere. To the heated kettle water was added a solution of 2.5 g SPS in 20 g DI water. This was immediately followed by 126.2 g of Core Polymer A and 20 g DI water. A monomer emulsion (ME I) that was prepared by mixing 40 g DI water, 3 g NaDDBS (23%), 40 g STY, 35.2 g MMA, and 4.8 g MAA was added to the kettle over a period of 60 min at 78° C. Upon the completion of ME I addition, the container was rinsed with 40 g DI water. A second monomer emulsion (ME II) was prepared by mixing 200 g DI water, 5 g NaDDBS (23%), 558.6 g STY, and 1.4 g allyl methacrylate. From this ME II, 115 g were removed and set aside. ME II was added to the kettle over a period of 50 min and a solution of 1.0 g of SPS in 60 g of DI water was co-fed to the reactor at a rate of 0.68 g/min. The temperature of the kettle was allowed to increase to 92° C. Upon completion of ME II, the ME II container was rinsed with 40 g DI water. The reaction mixture was allowed to cool to 85° C. and held at that temperature for 10 min. A third monomer emulsion (ME III) was made from 100 g DI water, 8 g NADDBS (23%), 228 g EA, and 12 g MAA. This ME III was added to the reaction mixture over 40 min. Upon the completion of ME III and SPS additions, the ME III container was rinsed with 40 g DI water. A mixture of 20 g 0.1% iron sulfate and 2 g 1% versene was added and the reaction contents were held for 15 min. A mixture of 3 g 5% 4-hydroxy TEMPO and 10 g DI water was added, followed by the held back portion of ME II (1 15 g) and 40 g DI water. Ammonium hydroxide (28%, 28.3 g) was then added and the reaction mixture was held at 85° C. for 10 min. A solution of 0.8 g SPS and 1.5 g 700/c tert-butyl hydroperoxide in 45 g DI water was added, followed by a solution of 0.7 g IAA in 40 g DI water. The reaction mixture was held at 85° C. for 15 min and then cooled to room temperature and filtered to remove any coagulum formed. The final latex had a solids content of 30.0%, a pH of 9.6, a particle size of 473 nm, and an S/mil 0.41. The dry density was determined to be 0.748 g/mL. When the latex was allowed to dry by casting a 3.5 mil coat on a polyvinyl substrate, a continuous film was formed. Measurement of the minimum film forming temperature (MFFT) showed that the MFFT was below −5° C.

COMPARATIVE EXAMPLE E
Preparation of Emulsion Polymer Particles. A Binder Composition was Polymerized After the Shell Polymerization, No MAA was Added in the Binder. Neutralization Took Place After Binder Polymerization.

A 5-liter, four necked round bottom flask was equipped with paddle stirrer, thermometer, nitrogen inlet and condenser. DI water (1300 g) was added to the kettle and heated to 82° C. under a nitrogen atmosphere. To the heated kettle water was added a solution of 2.5 g SPS in 20 g DI water. This was immediately followed by 126.2 g Core Polymer A and 20 g DI water. A monomer Emulsion (ME I) was prepared by mixing 40 g DI water, 3 g NaDDBS (23%), 40 g STY, 35.2 g MMA, and 4.8 g MAA was added to the kettle over a period of 60 min at 78° C. Upon the completion of ME I addition, the container was rinsed with 40 g DI water. A second monomer emulsion (ME II) was prepared by mixing 200 g DI water, 5 g NaDDBS (23%), 558.6 g STY, and 1.4 g allyl methacrylate. From this ME II, 115 g were removed and set aside. ME II was added to the kettle over a period of 50 min and a solution of 1.0 g SPS in 60 g DI water was co-fed to the reactor at a rate of 0.68 g/min. The temperature of the kettle was allowed to increase to 92° C. Upon completion of ME II, the ME II container was rinsed with 40 g DI water. The reaction mixture was allowed to cool to 85° C. and held at that temperature for 10 min. A third monomer emulsion (ME III) was made from 100 g DI water, 8 g NADDBS (23%), and 240 g EA. This ME III was added to the reaction mixture over 40 min. Upon the completion of ME III and SPS additions, the ME III container was rinsed with 40 g DI water. A mixture of 20 g 0.1% iron sulfate and 2 g 1% versene was added and the reaction contents were held for 15 min. A mixture of 3 g 5% 4-hydroxy TEMPO and 10 g DI water was added, followed by the held back portion of ME II (115 g) and 40 g DI water. Ammonium hydroxide (28%, 28.3 g) was then added and the reaction mixture was held at 85° C. for 10 min. A solution of 0.8 g SPS and 1.5 g 70% tert-butyl hydroperoxide in 45 g DI water was added, followed by a solution of 0.7 g IAA in 40 g DI water. The reaction mixture was held at 85° C. for 15 min and then cooled to room temperature and filtered to remove any coagulum formed. The final latex had a solids content of 30.0%, a pH of 9.8, a particle size of 455 nm, and an S/mil 0.32. The dry density was determined to be 0.841 g/mL. When the latex was allowed to dry by casting a 3.5 mil wet coat on a polyvinyl substrate, no film formation was observed.

COMPARATIVE EXAMPLE F
Preparation of Emulsion Polymer Particles. A Binder Composition was Polymerized After the Shell Polymerization, the Binder Contained 5% of MAA. Neutralization Took Place Half Way Through Shell Polymerization.

A 5-liter, four necked round bottom flask was equipped with paddle stirrer, thermometer, nitrogen inlet and condenser. DI water (1300 g) was added to the kettle and heated to 82° C. under a nitrogen atmosphere. To the heated kettle water was added a solution of 2.5 g SPS in 20 g DI water. This was immediately followed by 126.2 g of Core Polymer A and 20 g DI water. A monomer emulsion (ME I) that was prepared by mixing 40 g DI water, 3 g NADDBS (23%), 40 g STY, 35.2 g MMA, and 4.8 g MAA was added to the kettle over a period of 60 min at 78° C. Upon the completion of ME I addition, the container was rinsed with 40 g DI water. A second monomer emulsion (ME II) was prepared by mixing 200 g DI water, 5 g NaDDBS (23%), 558.6 g STY, and 1.4 g allyl methacrylate. ME II was added to the kettle over a period of 50 min and a solution of 1.0 g SPS in 60 g DI water was co-fed to the reactor at a rate of 0.68 g/min. The temperature of the kettle was allowed to increase to 92° C. When half of the ME II was added, ammonium hydroxide (28%, 28.3 g) was added to the reaction mixture. Upon completion of ME II, the ME II container was rinsed with 40 g DI water. The reaction mixture was allowed to cool to 85° C. and held at that temperature for 10 min. A third monomer emulsion (ME III) was made from 100 g DI water, 8 g NaDDBS (23%), 228 g EA, and 12 g MAA. This ME III was added to the reaction mixture over 40 min. Upon the completion of ME III and SPS additions, the ME III container was rinsed with 40 g DI water. A mixture of 20 g 0.1% iron sulfate and 2 g 1% versene was added, followed by a solution of 0.8 g SPS and 1.5 g 70% tert-butyl hydroperoxide in 45 g DI water was added. After the addition of a solution of 0.7 g IAA in 40 g DI water, the reaction mixture was held at 85° C. for 15 min and then cooled to room temperature and filtered to remove any coagulum formed. The final latex had a solids content of 30.0%, a pH of 9.6, a particle size of 467 nm, and an S/mil 0.32. When the latex was allowed to dry by casting a 3.5 mil coat on a polyvinyl substrate, no film formation was observed.

The lower MFFT, and film formation observed, of the emulsion polymer of Example 9 prepared by the process of this invention compared to the lack of film formation at room temperature observed in Comparative Examples E–F demonstrates the effect of surface modification by the soft MAA-containing binder polymer stage and the effectiveness of this invention.

EXAMPLE 10
Preparation of Emulsion Polymer Particles Having Chemically-modified Surfaces. Hydroxyethylcellulose was Incorporated into the Outer Shell by Mixing with a Second Stage Monomer Emulsion (ME II). Neutralization Took Place After Shell Polymerization.

A 5-liter, four necked round bottom flask was equipped with paddle stirrer, thermometer, nitrogen inlet and condenser. DI water (2100 g) was added to the kettle and heated to 84° C. under a nitrogen atmosphere. To the heated kettle water was added a solution all of 2.8 g of SPS in 20 g DI water. This was immediately followed by 189.9 g of Core Polymer B and 20 g DI water. A monomer Emulsion (ME I) was prepared by mixing 250 g DI water, 8 g NaDDBS (23%), and 827.4 g STY. From this ME I, 171 g were removed and set aside. The initial portion of the ME I was added to the kettle at a rate of 4.6 g/min at 79° C. Immediately after the ME I addition started, a solution of 12.6 g AA in 47.6 g DI water was poured into the reaction mixture. After 40 min, the addition rate of ME I was increased to 12 g/min and a solution of 1.0 g SPS in 60 g DI water was co-fed to the reactor at a rate of 1.0 g/min. The temperature of the kettle was allowed to increase to 92° C. Upon completion of ME I, the ME I container was rinsed with 40 g DI water and the reaction mixture was held at 92° C. for 10 min. A second monomer emulsion (ME II) was prepared from 250 g DI water, 2 g NaDDBS (23%), 18 g BA, 40.8 g of MMA, 1.2 g of MAA, and 19.8 g of hydroxyethyl cellulose (7.5%). This ME II was added to the reaction mixture over 15 min. Upon the completion of ME II and SPS additions, the ME II container was rinsed with 20 g DI water. A mixture of 8 g 5% 4-hydroxy TEMPO and 8 g DI water was added, followed by the held back portion of ME I (171 g) and 20 g of DI water. During the addition, the reaction mixture was allowed to cool to 85° C. Ammonium hydroxide (28%, 29.7 g) was then added and the reaction mixture was held at 85° C. for 5 min. A mixture of 8 g 0.1% iron sulfate and 0.8 g 1% versene was added, followed by a solution of 0.8 g SPS and 1.5 g 70% tert-butyl hydroperoxide in 45 g DI water and a solution of 0.7 g IAA in 40 g DI water. The reaction mixture was held at 85° C. for 15 minutes and then cooled to room temperature and filtered to remove any coagulum formed. The final latex had a solids content of 24.1%, a pH of 9.5, a particle size of 690 nm. The dry density was determined to be 0.573 g/mL. No clear layer or sedimentation was observed after the latex had stood at room temperature for 3 months.

EXAMPLE 11
Preparation of Emulsion Polymer Particles Having Chemically-modified Surfaces. Hydroxyethylcellulose was Incorporated into the Second Stage (Acrylic) of Solid Polymer Particles. Neutralization Took Place After Shell Polymerization.

A 5-liter, four necked round bottom flask was equipped with paddle stirrer, thermometer, nitrogen inlet and condenser. DI water (1700 g) was added to the kettle and heated to 85° C. under a nitrogen atmosphere. To the heated kettle water was added a solution of 2.8 g SPS in 20 g DI water. This was immediately followed by 22.1 g of an acrylic polymer dispersion (44.7% solids, 96 nm) and 20 g DI water. A monomer emulsion (ME I) was prepared by mixing 250 g DI water, 8 g NaDDBS (23%), and 814.8 g STY. From this ME I, 160 g were removed and set aside. MAA (25.2 g) was then added to the remaining ME I. ME I was added to the kettle over a period of 75 min and a solution of 1.0 g SPS in 60 g DI water was co-fed to the reactor at a rate of 0.68 g/min. The temperature of the kettle was allowed to increase to 92° C. Upon completion of ME I, the ME I container was rinsed with 40 g DI water and the reaction mixture was cooled to 85° C. A second monomer emulsion (ME II) was prepared from 250 g DI water, 2 g NaDDBS (23%), 18 g BA, 40.8 g MMA, 1.2 g MAA, and 19.8 g hydroxyethyl cellulose (7.5%). This ME II was added to the reaction mixture over 15 min. Upon the completion of ME II and SPS additions, the ME II container was rinsed with 40 g DI water. A mixture of 2.0 g 1% versene and 20.0 g 0.1% iron sulfate was added, and the reaction mixture was held at 85° C. for 15 min. After the addition of a mixture of 3 g 5% 4-hydroxy TEMPO and 10 g DI water, the held back portion of ME I (160 g) was added and the container was rinsed with 40 g DI water. Ammonium hydroxide (28%, 28.0 g) was then added and the reaction mixture was held at 85° C. for 10 min. A solution of 0.5 g SPS and 2.0 g 70% tert-butyl hydroperoxide in 40 g DI water was added, followed by a solution of 0.95 g IAA in 20 g DI water. The reaction mixture was held at 85° C. for 15 min and then cooled to room temperature and filtered to remove any coagulum formed. The final latex had a solids content of 26.9%, a pH of 10.1, and a particle size of 672 nm. No settlement was observed after the latex stood at room temperature for 3 months.

COMPARATIVE EXAMPLE G
Preparation of Emulsion Polymer Particles. Surface Unmodified Polymer Dispersion was Prepared and Then Mixed with a of Hydroxyethyl Cellulose Solution.

A 5-liter, four necked round bottom flask was equipped with paddle stirrer, thermometer, nitrogen inlet and condenser. DI water (1800 g) was added to the kettle and heated to 85° C. under a nitrogen atmosphere. To the heated kettle water was added a solution of 2.8 g SPS in 20 g DI water. This was immediately followed by 189.9 g Core Polymer B and 20 g DI water. A monomer Emulsion (ME) was prepared by mixing 250 g DI water, 8 g NaDDBS (23%), and 887.4 g STY. From this ME, 168 g were removed and set aside. The initial portion of the ME was added to the kettle at a rate of 5.2 g/min at 79° C. Immediately after the ME addition started, a solution of 12.6 g AA in 47.4 g DI water was added to the reaction mixture at once. After 20 min the ME was increased to 14 g/min and a solution of 1.0 g SPS in 60 g DI water was co-fed to the reactor at a rate of 1 g/min. The temperature of the kettle was allowed to increase to 92° C. Upon completion of the ME and cofeed SPS additions, the ME container was rinsed with 40 g DI water. A mixture of 8 g 5% 4-hydroxy TEMPO and 8 g DI water was added, followed by the held back portion of ME I (168 g) and 20 g DI water. During the addition, the reaction mixture was allowed to cool to 85° C. Ammonium hydroxide (28%, 29.7 g) was then added and the reaction mixture was held at 85° C. for 5 min. A mixture of 8 g 0.1% iron sulfate and 0.8 g 1% versene was added, followed by a solution of 0.8 g SPS and 2 g 70% tert-butyl hydroperoxide in 45 g DI water and a solution of 0.95 g IAA in 20 g DI water. The reaction mixture was held at 85° C. for 15 min and then cooled to room temperature and filtered to remove any coagulum formed. The final latex had a solids content of 27.5%, a pH of 9.8, a particle size of 510 nm. The dry density was determined to be 0.739 g/mL.

To the final latex dispersion (88 g) was added dropwise a solution of 0.50 g hydroxyethyl cellulose (7.5%) in 11.5 g DI water with stirring. After stirring for 30 min, the mixture was allowed to stand undisturbed. After 3 days, the latex started to settle and a clear top layer and sediment were observed.

The stability and absence of clear layers and sedimention of the hydroxyethyl cellulose surface-modified emulsion polymers of Examples 10–11 made by the process of this invention are superior to the emulsion polymer of Comparative Example G.

EXAMPLE 12

Preparation of Emulsion Polymer Particles Having Chemically-modified Surfaces. Phosphoethyl Methacrylate was in the Entire Shell (ME II) Except in the Held-out Portion. Neutralization Took Place After Shell Polymerization.

A 5-liter, four necked round bottom flask was equipped with paddle stirrer, thermometer, nitrogen inlet and condenser. DI water (1500 g) was added to the kettle and heated to 82° C. under a nitrogen atmosphere. To the heated kettle water was added a solution of 2.5 g SPS in 20 g DI water. This was immediately followed by 157.7 g of Core Polymer A and 20 g DI water. A monomer Emulsion (ME I) that was prepared by mixing 40 g DI water, 3 g NADDBS (23%), 50 g STY, 44 g MMA, and 6 g MAA was added to the kettle over a period of 40 min at 78° C. Upon the completion of ME I addition, the container was rinsed with 40 g DI water. A second monomer emulsion (ME II) was prepared by mixing 200 g of DI water, 10 g of NaDDBS (23%), 686 g of STY, and 3.5 g of linseed oil fatty acid. From this ME II, 133 g were removed and set aside. Phosphoethyl methacrylate (14 g) was then added to the remaining ME II. ME II was added to the kettle over a period of 60 min and a solution of 1.0 g SPS in 60 g DI water was co-fed to the reactor at a rate of 1 g/min. The temperature of the kettle was allowed to increase to 92° C. Upon completion of ME II and SPS additions, the ME II container was rinsed with 40 g DI water. The reaction mixture was allowed to cool to 856C. A mixture of 20 g 0.1% iron sulfate and 2 g 1% versene was added and the reaction contents were held for 15 min. A mixture of 5 g 5% 4-hydroxy TEMPO and 10 g DI water was added, followed by the held back portion of ME II(133 g) and 40 g DI water. Ammonium hydroxide (28%, 30.1 g) was then added and the reaction mixture was held at 85° C. for 10 min. A solution of 0.8 g SPS and 1.5 g 70% tert-butyl hydroperoxide in 45 g of DI water was added, followed by a solution of 0.7 g IAA in 40 g DI water. The reaction mixture was held at 85° C. for 15 min and then cooled to room temperature and filtered to remove any coagulum formed. The final latex had a solids content of 27.8%, a pH of 9.6, a particle size of 412 nm, and an S/mil 0.40. The dry density was determined to be 0.856 g/mL.

EXAMPLE 13

Preparation of Emulsion Polymer Particles Having Chemically-modified Surfaces. Oligomeric Acrylic Acid was in the Entire Shell (ME II) Except in the Held-out Portion. Neutralization Took Place After Shell Polymerization.

A 5-liter, four necked round bottom flask was equipped with paddle stirrer, thermometer, nitrogen inlet and condenser. DI water (1500 g) was added to the kettle and heated to 85° C. under a nitrogen atmosphere. To the heated kettle water was added a solution of 2.5 g SPS in 20 g DI water. This was immediately followed by 157.7 g Core Polymer A and 20 g DI water. A monomer emulsion (ME I) that was prepared by mixing 40 g DI water, 3 g NaDDBS (23%), 50 g STY, 44 g MMA, and 6 g MAA was added to the kettle over a period of 40 min at 78° C. Upon the completion of ME I addition, the container was rinsed with 40 g DI water. A second monomer emulsion (ME II) was prepared by mixing 200 g DI water, 10 g NADDBS (23%), and 686 g STY. From this ME II, 133 g were removed and set aside. Oligomeric acrylic acid (50 g, 28.8%) with an average molecular weight of 1200 was then added to the remaining ME II. ME II was added to the kettle over a period of 60 min and a solution of 1.0 g SPS in 60 g DI water was co-fed to the reactor at a rate of 1 g/min. The temperature of the kettle was allowed to increase to 92° C. Upon completion of ME II and SPS additions, the ME II container was rinsed with 40 g DI water. The reaction mixture was allowed to cool to 85° C. A mixture of 20 g 0.1% iron sulfate and 2 g 1% versene was added and the reaction contents were held for 15 min. A mixture of 5 g 5% 4-hydroxy TEMPO and 10 g DI water was added, followed by the held back portion of ME II (133 g) and 40 g DI water. Ammonium hydroxide (28%, 30.1 g) was then added and the reaction mixture was held at 85° C. for 10 min. A solution of 0.8 g SPS and 1.5 g 70% tert-butyl hydroperoxide in 45 g DI water was added, followed by a solution of 0.7 g IAA in 20 g DI water. The reaction mixture was held at 85° C. for 15 minutes and then cooled to room temperature and filtered to remove any coagulum formed. The final latex had a solids content of 27.7%, a pH of 9.6, a particle size of 409 nm, and an S/mil 0.35. The dry density was determined to be 0.834 g/mL.

EXAMPLE 14

Preparation of Emulsion Polymer Particles Having Chemically-modified Surfaces. Oligomeric acrylic acid was in the Outer Shell (ME III). Neutralization Took Place After Shell Polymerization.

A 5-liter, four necked round bottom flask was equipped with paddle stirrer, thermometer, nitrogen inlet and condenser. DI water (1500 g) was added to the kettle and heated to 85° C. under a nitrogen atmosphere. To the heated kettle water was added a solution of 2.5 g SPS in 20 g DI water. This was immediately followed by 157.7 g Core Polymer A and 20 g DI water. A monomer emulsion (ME I) that was prepared by mixing 40 g DI water, 3 g NaDDBS (23%), 50 g STY, 44 g MMA, and 6 g MAA was added to the kettle over a period of 40 min at 78° C. Upon the completion of ME I addition, the container was rinsed with 40 g DI water. A second monomer emulsion (ME II) was prepared by mixing 200 g DI water, 8 g NaDDBS (23%), and 600 g STY. From this ME II, 117 g were removed and set aside. ME II was added to the kettle over a period of 75 min and a solution of 1.0 g SPS in 60 g of DI water was co-fed to the reactor at a rate of 0.68 g/min. The temperature of the kettle was allowed to increase to 92° C. Upon completion of ME II and SPS additions, the ME II container was rinsed with 40 g DI water. A third monomer emulsion (ME III) was prepared from 30 g of DI water, 3 g NADDBS (23%), 95 g MMA, and 17.9 g oligomeric acrylic acid (28.8%) with an average molecular weight of 1200 and added to the reaction mixture over 15 min. A mixture of 20 g 0.1% iron sulfate and 2 g 1% versene was added and the reaction contents were held for 15 min. A mixture of 5 g 5% 4-hydroxy TEMPO and 10 g DI water was added, followed by the held back portion of ME II (117 g) and 40 g DI water. Ammonium hydroxide (28%, 26.1 g) was then added and the reaction mixture was held at 85 ° C. for 10 min. A solution of 0.8 g SPS and 1.5 g 70% tert-butyl hydroperoxide in 45 g DI water was added, followed by a solution of 0.7 g IAA in 20 g DI water. The reaction mixture was held at 85° C. for 15 min and then cooled to room temperature and filtered to remove any coagulum formed. The final latex had a solids content of 27.2%, a pH of 10.0, a particle size 430 nm, and an S/mil 0.40. The dry density was determined to be 0.768 g/mL.

EXAMPLE 15

Preparation of Emulsion Polymer Particles Having Chemically-modified Surfaces. 2-acrylamido-2-methyl-1-propanesulfonic acid(AMPS) was in the Last One-third of the Shell (ME II) Except in the Held-out Portion. Neutralization Took Place After Shell Polymerization.

A 5-liter, four necked round bottom flask was equipped with paddle stirrer, thermometer, nitrogen inlet and condenser. DI water (687 g) was added to the kettle and heated to 90° C. under a nitrogen atmosphere. To the heated kettle water was added a solution of 1.64 g SPS in 25 g DI water. This was immediately followed by 258.5 g Core Polymer C and 20 g DI water. A monomer Emulsion (ME I) that was prepared by mixing 78.5 g DI water, 0.53 g NaDDBS, (23% in water), 67.3 g STY, and 10.5 g AA was added to the kettle over a period of 15 min at 83° C. Upon the completion of ME I addition, the container was rinsed with 25 g of DI water. A second monomer emulsion (ME II) was prepared by mixing 289 g DI water, 3.27 g NaDDBS (23%), and 829 g STY. From this ME II, 64.3 g were removed and set aside. The remaining ME II was split to two portions, 704.6 g and 352.3 g. AMPS (28.2 g, 50% solids) was added to the second smaller portion (making MEIII). ME II was added to the kettle over a period of 50 min and a solution of 1.96 g SPS in 105 g DI water was co-fed to the reactor at a rate of 1.43 g/min. The temperature of the kettle was allowed to increase to 90° C. Upon completion of the ME II addition, ME III was added to the reaction over a period of 25 minutes. At the end of feeds, the ME container was rinsed with 25 g DI water and the reaction contents were held for 5 min. A solution of 1.7 g IAA in 25 g DI water was added and the reaction contents were held for 15 min. During the hold period a solution of 33.6 g NaDDBS (23%) and 1.76 g linseed oil fatty acid in 131 g DI water was added. The held back portion of ME II (64.3 g) and 20 g DI water was then added and the reaction mixture was held for 20 minutes. After hold period, 1135 g hot DI water was added and the temperature of reaction mixture was adjusted to 85° C. Ammonium hydroxide (28%, 35.4 g) was then added and the reaction mixture was held at 85° C. for 20 min. A mixture of 8.2 g 0.1% iron sulfate and 0.82 g 1% versene was added. A solution of 3.65 g 70% tert-butyl hydroperoxide in 49 g DI water and a solution of 2.27 g IAA in 50 g DI water were co-fed over 20 min. The reaction mixture was held at 85° C. for 10 min and then cooled to room temperature and filtered to remove any coagulum formed. The final latex had a solids content of 25.6%, and a particle size of 1.14 µm. The dry density was determined to be 0.571 g/mL. Titration of the deionized latex (after treatment with AMBERLITE IRN-150) in water showed that 68% of the shell acid was titratable and on the latex surface.

EXAMPLE 16

Preparation of Emulsion Polymer Particles Having Chemically-modified Surfaces. Sodium Styrene Sulfonate (SSS) was in the Last One-third of the Shell (ME II) Except in the Held-out Portion. Neutralization Took Place After Shell Polymerization.

Example 15 was repeated except that SSS was added in the second smaller portion of ME II after the removal of held-out ME II. That is, after taking 64.3 g of ME II and setting it aside, the remaining ME I was split to two portions, 704.6g and 352.3 g. SSS (14.1 g dissolved in 42.3 g DI water) was added to the second smaller portion, designated ME III. The addition rates remained the same. The final latex had a solids content of 25.3%, a particle size of 1.14 µm. The dry density was determined to be 0.542 g/mL. Titration of the deionized latex (after treatment with AMBERLITE IRN-150) in water showed that 56% of the shell acid was titratable and on the latex surface.

EXAMPLE 17

Preparation of Emulsion Polymer Particles Having Chemically-modified Surfaces. Phosphoethyl Methacrylate (PEM) was in the Last One-third of the Shell (ME II) Except in the Held-out Portion. Neutralization Took Place After Shell Polymerization.

Example 15 was repeated except that PEM was added in the second smaller portion of ME II after the removal of held-out ME II. That is, after taking 64.3 g of ME II and setting aside, the remaining ME II was split to two portions, 704.6 g and 352.3 g. PEM (14.1 g) was added to the second smaller portion, designated ME III. The addition rates remained the same. The final latex had a solids content of 25.2%, a particle size of 1.15 µm. The dry density was determined to be 0.545 g/mL. Titration of the deionized latex (after treatment with AMBERLITE IRN-150) in water showed that 86% of the shell acid was titratable and on the latex surface.

EXAMPLE 18

Preparation of Emulsion Polymer Particles Having Chemically-modified Surfaces. 2-Sulfoethyl methacrylate (SEM) was in the Last One-third of the Shell (ME II) Except in the Held-out Portion. Neutralization Took Place After Shell Polymerization.

Example 15 was repeated except that SEM was added in the second smaller portion of ME II after the removal of held-out ME II. That is, after taking 64.3 g of ME II and setting aside, the remaining ME II was split to two portions, 704.6g and 352.3 g. SEM (14.1 g) was added to the second smaller portion, designated as ME III. The addition rate remained the same. The final latex had a solids content of 25.3%, a particle size of 1.13 µm. The dry density was determined to be 0.539 g/mL. Titration of the deionized latex (after treatment with AMBERLITE IRN-150) in water showed that 84% of the shell acid was titratable and on the latex surface.

EXAMPLE 19

Preparation of Emulsion Polymer Particles Having Chemically-modified Surfaces. A Cationic Shell Containing 13.4% N-[3-(dimethylamino)propyl]methacrylamide (DMAPMA) was Polymerized After a Styrene Shell Polymerization. Neutralization Took Place Before Cationic Shell Polymerization.

A 5-liter, four necked round bottom flask was equipped with paddle stirrer, thermometer, nitrogen inlet and condenser. DI water (680 g) was added to the kettle and heated to 90° C. under a nitrogen atmosphere. To the heated kettle water was added a solution of 1.46 g SPS in 22 g DI water. This was immediately followed by 229.6 g Core Polymer C and 11 g DI water. A monomer Emulsion (ME I) that was prepared by mixing 73.3 g DI water, 0.49 g NaDDBS (23%), 64.8 g MMA, 6.55 g BMA, and 1.46 g MAA was added to the kettle over a period of 15 min at 83° C. Upon the completion of ME I addition, the container was rinsed with 22 g DI water. A second monomer emulsion (ME II) was prepared by mixing 257 g DI water, 2.90 g NADDBS (23%), and 749 g STY. From this ME II, 57.1 g were removed and set aside. The remaining ME II was added to the kettle over a period of 80 min and a solution of 1.74 g SPS in 93.2 g DI water was co-fed to the reactor at a rate of 1.27 g/min. The temperature of the kettle was allowed to increase to 90° C. Upon completion of ME II and SPS additions, the ME II container was rinsed with 22 g DI water and the reaction contents were held for 5 min. A solution of 1.5 g IAA in 22 g DI water was added and the reaction contents were held for 15 min. During the hold period a solution of 29.9 g NaDDBS (23%) and 1.56 g linseed oil fatty acid in 116 g of DI water was added. The held back portion of ME II (57.1 g) and 20 g of DI water was then added and the reaction mixture was held for 20 min. After hold period, 1400 g hot DI water was added and the temperature of reaction mixture was adjusted to 85° C. Ammonium hydroxide (28%, 31.5 g) was then added and the reaction mixture was held at 85° C. for 20 min. The reaction mixture was allowed to cool to 60° C. and a mixture of 14.6 g 0.1% iron sulfate and 1.46 g 1% versene was added. A third monomer emulsion (ME III) was made from 77.2 g DI water, 32 g TRITON X-405 (70%), 97.7 g EA, 32.1 g of MMA and 20.1 g DMAPMA. ME III was added to the reaction mixture at a rate of 8.1 g/min and a solution of 1.35 g 70% tert-butyl hydroperoxide in 50 g DI water and a solution of 0.9 g IAA in 50 g DI water was co-fed to the reactor at a rate of 1.43 g/min. Upon completion of ME III, the ME III container was rinsed with 22 g DI water. A solution of 3.24 g 70% tert-butyl hydroperoxide in 43.7 g DI water and a solution of 2.02 g IAA in 44.7 g DI water were co-fed to over 20 min. The reaction mixture was held at 60° C. for 10 min and then cooled to room temperature and filtered to remove any coagulum formed. The final latex had a solids content of 24.6%. The dry density was determined to be 0.497 g/mL.

EXAMPLE 20

Preparation of Emulsion Polymer Particles Having Chemically-modified Surfaces. A Cationic Shell Containing 20% DMAPMA was Polymerized After the Styrene Shell Polymerization. Neutralization Took Place Before Cationic Shell Polymerization.

Example 19 was repeated except that the third monomer emulsion (ME III) was made from 200.6 g DI water, 76.8 g TRITON X-405 (70%) (TRITON is a trademark of Union Carbide Corp.), 239.8 g STY and 59.9 g DMAPMA. ME III was added to the reaction mixture at a rate of 10.4 g/min and a solution of 4.05 g 70% tert-butyl hydroperoxide in 106 g DI water and a solution of 2.7 g IAA in 108 g DI water was co-fed to the reactor at a rate of 2.0 g/min. Upon completion of ME III, the ME III container was rinsed with 44 g DI water. A solution of 6.48 g 70% tert-butyl hydroperoxide in 87.4 g DI water and a solution of 4.03 g IAA in 89.4 g DI water were co-fed to over 20 minutes. The reaction mixture was held at 60° C. for 10 min and then cooled to room temperature and filtered to remove any coagulum formed. The final latex had a solids content of 25.0%. The dry density was determined to be 0.597 g/mL.

EXAMPLE 21

Preparation of Emulsion Polymer Particles Having Chemically-modified Surfaces. A Shell Containing 13.4% oxazolidinyl ethyl methacrylate(OXEMA) was Polymerized After the Styrene Shell Polymerization. Neutralization Took Place Before Cationic Shell Polymerization.

Example 20 was repeated except that the third monomer emulsion (ME III) was made from 154.3 g DI water, 76.8 g TRITON X-405 (70%), 160.3 g BA, 48.0 g EA, 50.9 g OXEMA. The final latex had a solids content of 25.0%. The dry density was determined to be 0.669 g/mL.

EXAMPLE 22

Preparation of Emulsion Polymer Particles Having Chemically-modified Surfaces. A Shell Containing 20% OXEMA was Polymerized After the Styrene Shell Polymerization. Neutralization Took Place Before Cationic Shell Polymerization.

Example 20 was repeated except that the third monomer emulsion (ME III) was made from 154.3 g DI water, 76.8 g TRITON X-405 (70%), 149.8 g BA, 48.0 g EA, 42.0 g MMA and 59.9g OXEMA. The final latex had a solids content of 25.2%. The dry density was determined to be 0.641 g/mL.

I claim:

1. A process for chemically-modifying the surface of a polymer particle, comprising:

(a) providing an aqueous emulsion comprising
(i) a multistage emulsion polymer comprising a core stage polymer and a shell stage polymer,
wherein said core stage polymer comprises, as polymerized units, from 5% to 100% by weight, based on the weight of said core stage polymer, of hydrophilic monoethylenically unsaturated monomer, and from 0% to 95% by weight, based on the weight of said core stage polymer, of at least one nonionic monoethylenically unsaturated monomer; and
wherein said shell stage polymer comprises, as polymerized units, at least 50% by weight of nonionic monoethylenically unsaturated monomer;
(ii) a nonionic monomer at a level of at least 0.5% by weight based on the weight of said multistage emulsion polymer; and
(iii) at least one surface-modifying chemical capable of chemically bonding with said nonionic monomer; under conditions wherein there is no substantial polymerization of said nonionic monomer; and (b) reducing the level of said nonionic monomer by at least 50%.

2. The process of claim 1 further comprising the step of adding an effective amount of one or more polymerization inhibitors or reducing agents to substantially stop any polymerization.

3. The process of claim 2 wherein said one or more polymerization inhibitors or reducing agents are added in an amount of from 25 ppm to 5,000 ppm based onpolymer solids.

4. The process of claim 2 wherein said one or more polymerization inhibitors are selected from the group consisting of N,N-diethylhydroxylamine, N-nitrosodiphenylamine, 2,4-dinitrophenylhydrazine, p-phenylenediamine, phenothiazine, alloocimene, triethyl phosphite, 4-nitrosophenol, 2-nitrophenol, p-aminophenol, 4-hydroxy TEMPO, hydroquinone, p-methoxyhydroquinone, tert-butyl-p-hydroquinone, 2,5-di-tert-butyl-p-hydroquinone, 1,4-naphthalenediol, 4-tert butyl catechol, copper sulfate, copper nitrate, cresol and phenol.

5. The process of claim 1 wherein said nonionic monomer at a level of at least 0.5% by weight based on the weight of said emulsion polymer is one or more of said nonionic monoethylenically unsaturated monomers used to prepare said emulsion polymer.

6. The process of claim 1 wherein said level of nonionic monomer is reduced to less than 10,000 ppm based on polymer solids by polymerizing said nonionic monomer.

7. Emulsion polymer particles having chemically-modified surfaces prepared by the process of claim 1.

8. The process of claim 1 wherein said at least one surface-modifying chemical is selected from the group consisting of terminally-unsaturated oligomers, hydroxycellulose, polyvinyl alcohol, poly(N-vinyl pyrolidone), and polyacrylamides.

* * * * *